United States Patent [19]
Heider et al.

[11] Patent Number: 5,303,972
[45] Date of Patent: Apr. 19, 1994

[54] REMOTE CONTROL FOR BOX TOP CLOSURE

[76] Inventors: Merle J. Heider, 203-12th St. SW.; Dale J. Heider, 1108 Eighth Ave. SW.; Leon J. Heider, 1107 Third Ave. SW.; Craig J. Heider, 812 S. Taft St., all of Humboldt, Iowa 50548

[21] Appl. No.: 893,651
[22] Filed: Jun. 4, 1992
[51] Int. Cl.$^5$ .............................................. B60P 7/04
[52] U.S. Cl. ...................... 296/98; 296/100; 160/310; 318/16
[58] Field of Search .............. 296/98, 100; 160/7, 160/243, 310; 318/16

[56] References Cited
U.S. PATENT DOCUMENTS

| | | | |
|---|---|---|---|
| 3,699,578 | 10/1972 | Fiorentino | 318/16 X |
| 3,732,570 | 5/1973 | Fiorentino | 318/16 X |
| 4,518,193 | 5/1985 | Heider et al. | 296/98 |
| 4,529,098 | 7/1985 | Heider et al. | 220/211 |
| 4,848,823 | 7/1989 | Flohr et al. | 296/98 |

Primary Examiner—Dennis H. Pedder
Attorney, Agent, or Firm—Zarley, McKee, Thomte, Voorhees, & Sease

[57] ABSTRACT

A top closure for a rectangular box includes a tarpaulin having one edge connected to one top edge of the box, and having the opposite edge wound around an elongated shaft. A reversible motor is connected to the shaft for winding and unwinding the tarpaulin to open and close the top closure. A remote transmitter is adapted to send either a wind or an unwind signal to a receiver which is connected through solenoids to the reversible motor. By pressing one button on the remote transmitter it is possible to rotate the motor in one direction, and by pressing the other button on the remote transmitter it is possible to rotate the motor in the opposite direction.

3 Claims, 2 Drawing Sheets

REMOTE CONTROL FOR BOX TOP CLOSURE

BACKGROUND OF THE INVENTION

The present invention relates to a remote control for a box top closure.

Various attempts have been made to provide a top closure for an elongated box having an upper open end. Tarpaulins or other flexible sheet members can be rolled across the open upper end of the box to provide a cover. Such a cover has application for covering the tops of truck trailers, for covering the upper ends of bins, or for covering such things as solar collectors.

Typical prior art top closures are shown in U.S. Pat. No. 4,518,193 dated May 21, 1985 and in U.S. Pat. No. 4,529,098 dated Jul. 16, 1985. These prior patents show a top closure comprised of a flexible sheet member sized to fit in covering relation over a top opening of a box. One edge of the sheet member is attached to the upper edge of one of the box walls. An elongated shaft extends between the two opposite ends of the box. The flexible sheet member is rolled around the shaft. The shaft is capable of rolling from an open position wherein the tarpaulin is wound completely around the shaft to expose the top opening of the box to a closed position wherein the tarpaulin is unwound from the shaft and is completely covering the top opening of the box. Reversal of the rotational direction of the shaft permits the shaft to roll back to open and uncover the box. In prior devices the shaft may be rotated either by an electrical motor or by a manual crank.

A primary object of the present invention is the provision of an improved remote control for causing the tarpaulin to be rolled and unrolled to open and close the upper end of a box.

A further object of the present invention is the provision of a remote control which can be operated with a separate remote transmitter held by an operator who is standing in spaced relation to the truck trailer or other box which is being covered.

A further object of the present invention is the provision of a remote control for a box top closure which is simple in construction, efficient in operation, and reliable to use.

BRIEF DESCRIPTION OF THE INVENTION

The present invention utilizes a reversible electric motor for rotating the shaft around which the tarpaulin is wound. Rotation of the shaft in one direction causes the tarpaulin to be wound around the shaft from its covered position to its uncovered position, and rotation in the opposite direction causes the tarpaulin to be unrolled and moved to its covered position.

An electrical control system is connected to the motor and is capable of changing from a normal condition for causing the deactuation of the motor to a winding condition for causing the motor to rotate the shaft in a first direction to wind the sheet member. The control system can be changed from its winding condition to an unwinding condition which causes reversal of the motor thereby reversing the rotational direction of the shaft to unwind the sheet member and cause it to move to its covering position.

A remote hand-held transmitter is used to actuate the electrical control system. The remote transmitter has two buttons. One button causes actuation of the control system to rotate the motor in one direction and the other button causes actuation of the control system to rotate the motor in the opposite direction.

The control system is comprised of a plurality of solenoid switches which may be actuated in various combinations to cause the control system to be in a normal deactuator condition, in a winding condition for winding the tarpaulin, or in an unwinding condition for unwinding the tarpaulin. A receiver is adapted to receive signals from the remote transmitter. Depending upon which signal is received, the receiver causes the solenoids within the control system to change from their deactuated condition to their winding condition or their unwinding condition.

DESCRIPTION OF THE PREFERRED EMBODIMENT

Figure 1:
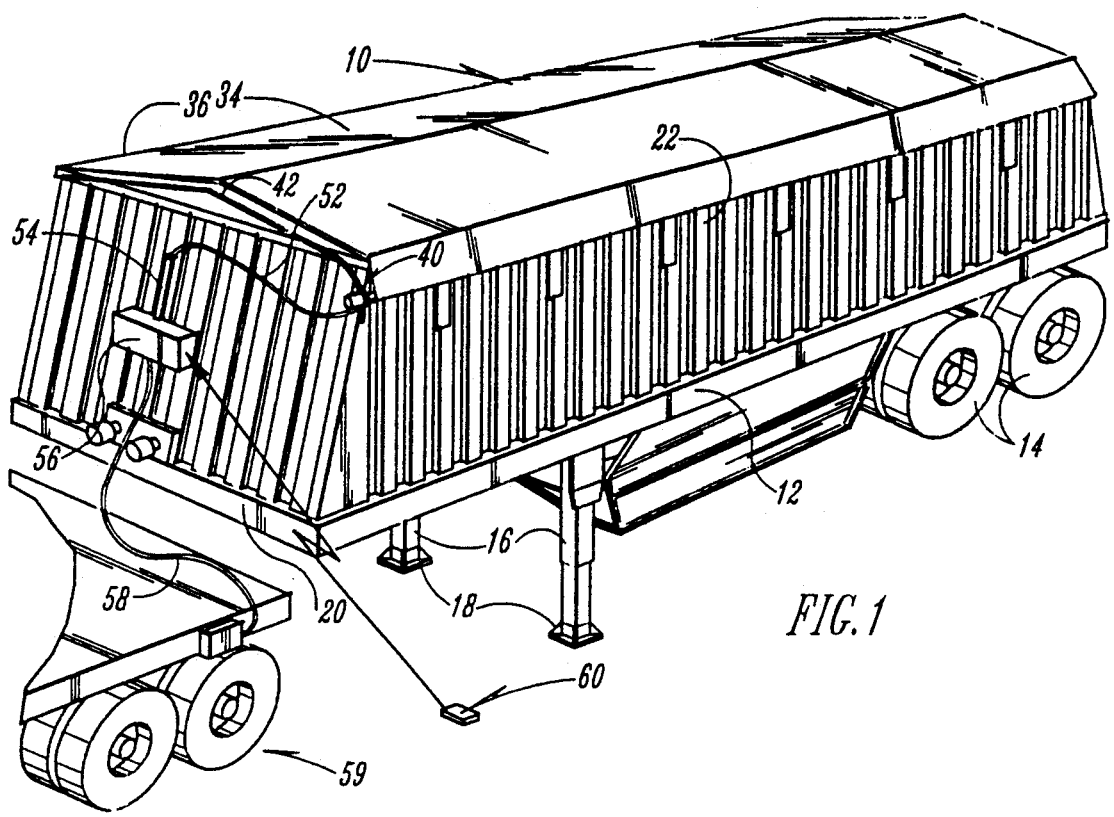
FIG. 1 is a perspective view of a grain trailer having a tarpaulin cover.

Referring to the drawings, the numeral 10 generally designates a trailer commonly used to carry grain or other bulk materials.

Trailer 10 comprises a trailer bed 12 which is supported by wheels 14 and by dolly legs 16 having dolly feet 18 on the bottom thereof. Trailer 10 includes a front wall 20 and sidewalls 22 which form a box having a top opening 24. Top opening 24 is defined by a front edge 26, side edges 28, 30, and a rear edge (not shown). A ridge pole 32 extends longitudinally along the center of top opening 24.

Figure 2:
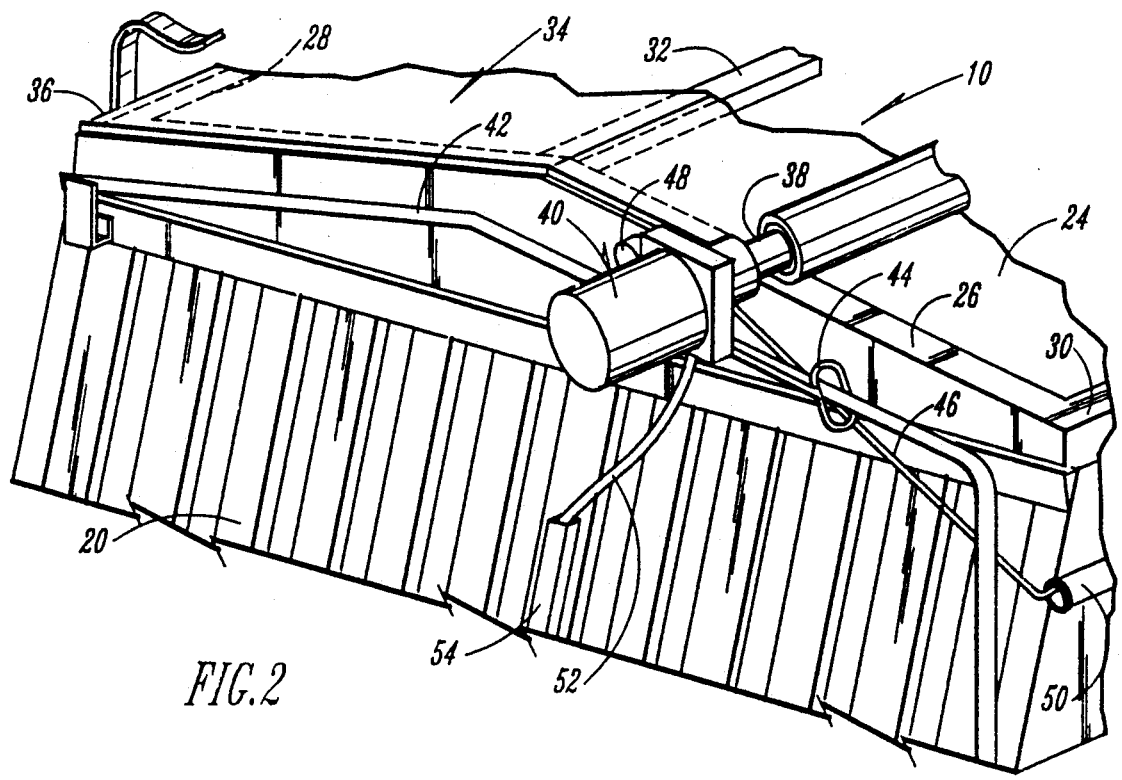
FIG. 2 is a detailed perspective view of the motor which operates the shaft for winding and unwinding the tarpaulin.

A flexible cover is provided for top opening 24 by a tarpaulin 34 having one edge 36 attached to the side edge 28 of top opening 24. A shaft 38 is attached to the opposite edge of tarpaulin 34 and is adapted to rotate so as to wind tarpaulin 34 around shaft 38 as shown in FIG. 2.

A reversible motor 40 is attached to shaft 38 and is guided by a guide rail 42 which receives guide bracket 44 attached to motor 40. A spring 46 is also attached to motor 40 by means of coupling 48, and extends into a tube 50 which runs longitudinally along the sidewall 22 of trailer 10. The other end (not shown) of spring 46 is anchored near the forward end of trailer 10. The purpose of spring 46 is to yieldably urge the shaft 38 and the motor 40 toward the right-hand edge 30 of opening 24.

An electrical control chord 52 extends from motor 40 downwardly through a conduit 54 on the front wall 20 of trailer 10. Control chord 52 is connected at its lower end to a control box 56. Control box 56 includes a plug receptacle 78 (FIG. 3) for receiving power chord 58 which is connected to the battery 76 of a tractor 59.

The control system for controlling motor 40 includes a remote hand-held transmitter 60, a receiver 66 and solenoid system 61. Receiver 66 and solenoid system 61 which are contained within control box 56. Transmitter 60 comprises a wind button 62 and an unwind button 64, and is adapted to transmit two different signals in response to the pressing of either of these two buttons. A first signal for winding the tarpaulin is transmitted when button 62 is pressed, and a second signal for unwinding the tarpaulin is transmitted when depressing button 64.

The particular type of signal which may be used can be varied without detracting from the invention. A conventional radio signal or other types of signals such as infrared signals may also be utilized without detracting from the present invention.

A preferred example of a transmitter is manufactured by Whetron Manufacturing Company, having an address of P.O. Box 87-919 Taipei, Taiwan 10528, under the Model No. RF102QT. It is adapted to be used with a receiver manufactured by the same company under the Model No. RF101212. Receiver 66 is adapted to produce a first output signal through output line 68 in response to receiving the signal from transmitter 60 resulting from depression of button 62. Receiver 66 is adapted to produce a second output signal through output line 70 in response to receiving a signal from transmitter 60 when button 64 is depressed. As can be shown in FIG. 3, both of these signals represent a positive electrical signal in the circuit shown in FIG. 3.

Solenoid system 61 comprises first, second, third, and fourth solenoid switches 80, 82, 84, 86. These switches are provided with a first coil 88, second coil 90, third coil 92, and fourth coil 94 respectively which surround first armature 96, second armature 98, third armature 100, and fourth armature 102 respectively. Armatures 96, 98, 100, 102 include switch connectors 104, 106, 108, and 110 respectively, and are adapted to move in longitudinal reciprocating action in response to actuation of the respective coils therein. First solenoid switch 80 includes two spaced apart switch contacts 112, 114. Second solenoid switch 82 includes two spaced apart switch contacts 116, 118; third solenoid switch 84 includes two spaced part switch contacts 120, 122; and fourth solenoid switch 86 includes two spaced apart switch contacts 124, 126. Springs 128, 130, 132, and 134 yieldably bias the armatures 96, 98, 100, and 102 to their left most position shown in FIG. 3. Upon actuation of any one of the coils 88, 90, 92, 94, the armatures within those respective coils move against the bias of the springs to the right as shown by shadow lines in FIG. 3. In the right-hand position of each armature, the contacts 104, 106, 108, 110 make electrical contact between the respective switch contacts. For example, in solenoid switch 80, actuation of the coil 88 causes armature 96 to move to the right so that connector 104 makes electrical contact between switch contacts 112, 114.

Switch contact 126 of solenoid switch 86 and switch contact 122 of solenoid switch 84 are interconnected by a connecting strap 144. Switch contact 120 of third solenoid switch 84 and switch contact 116 of second solenoid switch 82 are interconnected by a connecting strap 146. Similarly, switch contact 118 of second solenoid switch 82 is connected to switch contact 114 of first solenoid switch 80 by means of a connecting strap 148.

Receiver 66 is powered from battery 76 through an input positive line 72 and an input negative line 74. Input positive line 72 is connected to the positive terminal of battery 76 through contact 118, connecting strap 148, and contact 114. The input negative line 74 is connected to the negative terminal of battery 76 through contact 126, connecting strap 144, and contact 122.

Figure 3:
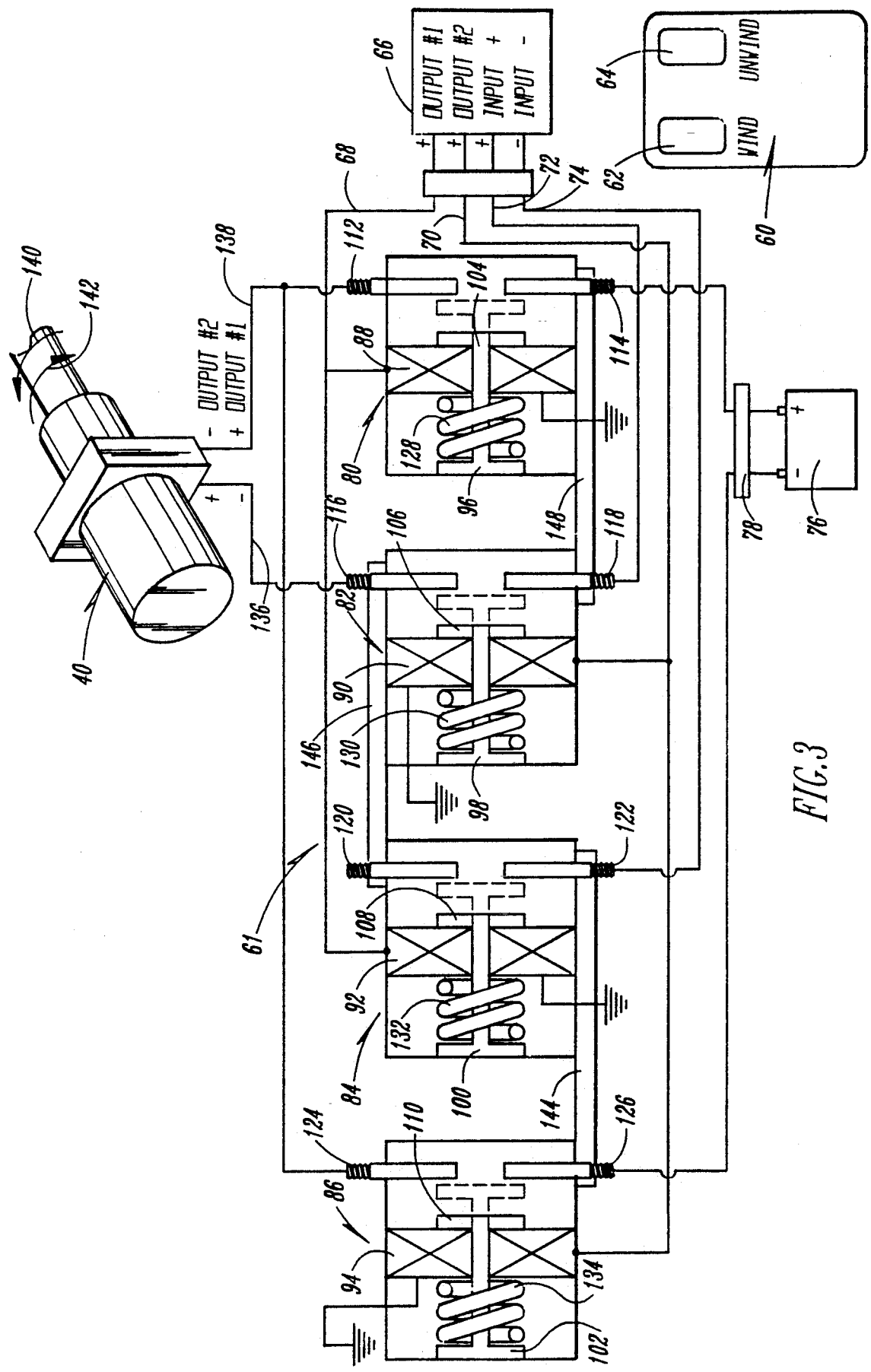
FIG. 3 is a schematic view showing the control system of the present invention and showing the remote hand-held transmitter.

In FIG. 3, motor 40 is shown to be powered by two output lines 136, 138 which are connected to electrical contact 116 of solenoid switch 82 and contact 112 of solenoid switch 80 respectively.

In operation, when button 62 is depressed on remote transmitter 60, a signal is transmitted to the receiver 66, and receiver 66 is adapted to produce a positive signal through output line 68 in response thereto. This actuates the coils 88, 92 of the first and third solenoid assemblies 80, 84 respectively. The armatures 96, 100 are moved to the right so that the connectors 104, 108 make contact with contact pairs 112, 114, and 120, 122 respectively. Contact 122 is in electrical continuity with the negative pole of battery 76, and contact 114 is in electrical connection with the positive terminal of battery 76. The result is that input line 136 to motor 40 is negative, and input line 138 to motor 40 is positive, thereby driving motor 40 in its wind direction designated by the arrow 140. When the button 62 is no longer depressed, the solenoids 80, 84 return to their deactuated position, thereby breaking contact to motor 40 and deactuating motor 40.

When it is desired to rotate the shaft in its unwind direction designated by the arrow 142, button 64 is depressed on transmitter 60. In response to receiving the signal from transmitter 60, receiver 66 is adapted to produce a positive output signal through output line 70, thereby actuating second and fourth coils 90, 94 of second, and fourth solenoid switches 82, 86. In response to the actuation of these solenoid coils, the switch connectors 106, 110 move to the right forming electrical connection between contact pairs 116, 118 and 124, 126 respectively. Contact 126 is in electrical connection with the negative terminal of battery 76, and therefore the closing of solenoid switch 86 causes input line 138 of motor 40 to be placed in a negative condition. Contact 118 of second solenoid switch assembly 82 is in electrical connection with the positive terminal of battery 76 by virtue of the connecting strap 148 and contact terminal 114. Thus, the closing of the switch connector 106 of second solenoid switch 82 results in input line 136 being positive thereby causing motor 140 to rotate in its unwind direction designated by the arrow 142.

The remote system of the present invention greatly simplifies the manner in which the operator can open and close the top closure for the trailer 10. The operator need merely grasp the hand-held transmitter 60 and push the appropriate button 62 or 64 either to close or to open the top closure of the box.

The preferred embodiment of the invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

We claim:

1. A top closure for a rectangular box having a pair of opposite end walls and a pair of opposite sidewalls, said box having a top opening adjacent the upper edges of said end and sidewalls, said top closure comprising:
   a flexible sheet member having first and second opposite edges and being sized to fit in covering relation over said top opening, said first edge of said sheet member being attached to one of said sidewalls adjacent said upper edge thereof;
   an elongated shaft having opposite ends, said shaft being attached to said second edge of said sheet member with said sheet member being wound around said shaft, said shaft being capable of turning in a first direction for unwinding said sheet member and being capable of turning in a second direction for winding said sheet member around said shaft;

a reversible motor connected to said shaft for causing rotation thereof, said motor having first and second terminals connectable to positive and a negative sources respectively of electricity for driving said shaft in said first direction, and being responsive to reversal of connection of said positive and negative sources of electricity to said first and second terminals of said motor for driving said shaft in said second direction;

an electrical power source having a positive terminal and a negative terminal;

electrical control means comprising first, second, third, and fourth relays, each having a relay switch associated therewith and each being normally in a deactuated condition wherein said relay switch associated therewith is in an open position, each of said relays being actuatable to cause said relay switch associated therewith to move to a closed position;

said relay switch associated with said first relay being connected between said positive terminal of said power source and said first terminal of said reversible motor;

said relay switch associated with said second relay being connected between said positive terminal of said power source and said second terminal of said reversible motor;

said relay switch associated with said third relay being connected between said negative terminal of said power source and said second terminal of said reversible motor;

said relay switch associated with said fourth relay being connected between said negative terminal of said power source and said first terminal of said reversible motor;

a remote transmitter capable of selective transmission of first and second signals;

a receiver connected to said first, second, third, and fourth relays, said receiver having means responsive to reception of said first signal from said transmitter to cause actuation of said first and third relays and closing of said relay switches associated therewith, and having means responsive to reception of said second signal from said transmitter to cause actuation of said second and fourth relays and closing of said relay switches associated therewith, whereby said first and second terminals of said reversible motor will be connected to said positive and negative terminals respectively of said power source in response to said receiver receiving said first signal, and said first and second terminals will be connected to said negative and positive terminals respectively, in response to said receiver receiving said second signal.

2. A top closure according to claim 1 wherein each of said first, second, third, and fourth relays further comprises a solenoid associated therewith for moving said relay switch associated therewith from its said open to tis said closed position, said receiver means causing actuation of said first and third relays having a first output circuit connected to said solenoids associated with said first and said third relays, and said means causing actuation of said second and fourth relays having a second output circuit connected to said solenoids associated with said second and said fourth relays.

3. A top closure according to claim 2 wherein each of said first, second, third and fourth relays each further comprises yieldable bias means yieldably urging said relay switch associated therewith to said open position.

* * * * *